A. J. CURTIS.
Tire-Tightener.
No. 51,808.
Patented Jan. 2 1866.
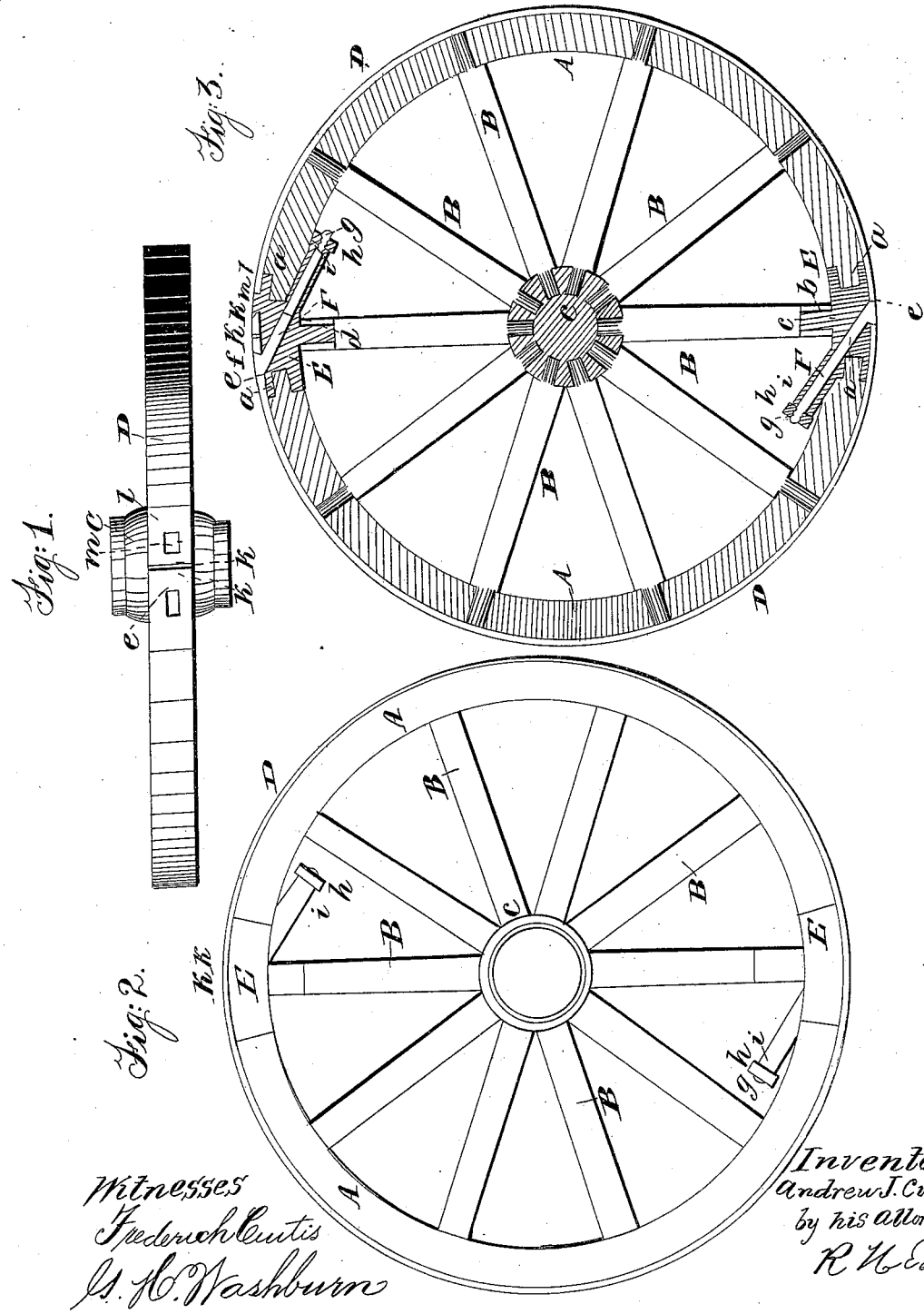

UNITED STATES PATENT OFFICE.

ANDREW J. CURTIS, OF WEST WINTERPORT, MAINE.

IMPROVEMENT IN CARRIAGE-WHEELS.

Specification forming part of Letters Patent No. 51,808, dated January 2, 1866.

*To all whom it may concern:*

Be it known that I, ANDREW J. CURTIS, of West Winterport, in the county of Waldo and State of Maine, have invented a new and useful Improvement in Carriage-Wheels; and I do hereby declare the same to be fully described in the following specification and represented in the accompanying drawings, of which—

Figure 1 denotes a top view, Fig. 2 a side elevation, and Fig. 3 a vertical and longitudinal section, of a wheel provided with my said invention, the purpose of which is to secure the tire in place and tighten it properly on the rim or felly of the wheel.

In the drawings, A denotes the felly, B B B, &c., the spokes, C the hub, and D the tire, of a carriage-wheel, they being arranged together in the ordinary manner, except that at opposite parts of the wheel the felly has placed within it two metallic socket-pieces, E E, made with sockets $a\ a\ b$, two of which in each part E are arranged for the reception of the ends of the wooden part of the felly, and the other, $b$, is for holding a tenon, $c$, extending from one of the spokes. Each of the parts E has a passage, $d$, formed through it at an acute angle with the tire, such tire at the outer end of the said passage being furnished with a hole, $e$, for reception of the hooked head of a screw-bolt, F, which goes through the passage $d$, and has a screw, $g$, and nut $h$ where it projects from the passage $d$. The nut operates against a shoulder or abutment, $i$, extending from the felly and forming part of the socket-piece E.

The two ends of the tire are represented at $k\ k$, it being a bar of metal bent around in the form of a hoop, and being provided with a hole, $l$, which is arranged near to one of its ends $k\ k$, and formed to receive and fit to the inclined or hooked head of a stud or screw, $m$, fixed in and so as to project from one of the socket-pieces E, in manner as shown in Figs 1 and 3.

Each passage $d$ should be of a sufficient size to allow of all the necessary movements (whether lengthwise or otherwise) of its bolt F while in the act of drawing the tire closely on the circumference of the felly.

As many of the socket-pieces E, with their straining bolts and screws, may be applied to or disposed within the felly as may be necessary, one being sufficient in many instances, although it will be better to have two or more of them.

In applying the tire it is to be hooked upon the stud $m$ and the head of the lever-bolt F, after which the nut of the said bolt should be screwed up against its abutment, so as to cause the bolt to draw closely upon the felly that part of the tire which may extend between the bolt and the stud $m$. Next the tire should be hooked upon the head $f$ of the upper bolt, after which the nut of such bolt should be screwed up against its abutment, so as to draw the remaining part of the tire closely into place on the felly.

With my invention applied to a wheel it will be seen that whenever the tire thereof may become loose on the wheel it will be a very easy matter to tighten it.

What I claim is—

The combination and arrangement, substantially as hereinbefore explained, of one or more screw-bolts, F, and the stud $l$ with a wheel felly and tire, or with the same and one or more socket-pieces, E, arranged with respect to the felly substantially as hereinbefore specified.

ANDREW J. CURTIS.

Witnesses:
 JOHN WHITE,
 G. L. CURTIS.